(12) United States Patent
Cho

(10) Patent No.: US 10,520,356 B2
(45) Date of Patent: Dec. 31, 2019

(54) APPARATUS, METHOD AND MONITORING SYSTEM FOR MEASURING NOISE BETWEEN FLOORS

(71) Applicant: Center for Integrated Smart Sensors Foundation, Daejeon (KR)

(72) Inventor: Hyun Tae Cho, Daejeon (KR)

(73) Assignee: CENTER FOR INTEGRATED SMART SENSORS FOUNDATION, Daejeon (KR)

( * ) Notice: Subject to any disclaimer, the term of this patent is extended or adjusted under 35 U.S.C. 154(b) by 0 days.

(21) Appl. No.: 16/240,467

(22) Filed: Jan. 4, 2019

(65) Prior Publication Data

US 2019/0212189 A1 Jul. 11, 2019

(30) Foreign Application Priority Data

Jan. 5, 2018 (KR) .................. 10-2018-0001463

(51) Int. Cl.
*H04R 3/00* (2006.01)
*H04R 29/00* (2006.01)
*G01H 11/08* (2006.01)
*H04R 1/08* (2006.01)
*H04R 1/10* (2006.01)

(52) U.S. Cl.
CPC ............. *G01H 11/08* (2013.01); *H04R 1/08* (2013.01); *H04R 1/1083* (2013.01); *H04R 3/005* (2013.01); *H04R 29/005* (2013.01); *H04R 2201/021* (2013.01)

(58) Field of Classification Search
CPC ...... H04R 1/1083; H04R 3/005; H04R 17/06; H04R 17/08; H04R 2201/021; H04R 2410/05; H04R 29/00; H04R 29/005; G01H 11/00; G01H 11/06; G01H 11/08
USPC ... 381/91, 122, 56, 71.2, 71.7, 71.13, 71.14, 381/94.1–94.8; 73/645
See application file for complete search history.

(56) References Cited

U.S. PATENT DOCUMENTS

| | | | | |
|---|---|---|---|---|
| 6,483,926 | B1* | 11/2002 | Yamashita | G10K 11/178 381/71.7 |
| 7,203,322 | B1* | 4/2007 | Bostock | H04R 1/1083 381/67 |
| 8,917,879 | B2* | 12/2014 | Sato | G10K 11/178 381/71.8 |
| 9,549,252 | B2* | 1/2017 | Suvanto | H04R 3/005 |
| 2016/0316293 | A1* | 10/2016 | Klimanis | H04L 12/2823 |

(Continued)

FOREIGN PATENT DOCUMENTS

| KR | 2009-0038652 A | 4/2009 |
|---|---|---|
| KR | 10-1561849 B1 | 10/2015 |
| KR | 2015-0144456 A | 12/2015 |

(Continued)

*Primary Examiner* — Xu Mei
(74) *Attorney, Agent, or Firm* — Christensen O'Connor Johnson Kindness PLLC

(57) ABSTRACT

Disclosed is a device, a method, and a system for analyzing and monitoring noise information and a noise type based on a noise-between-floors using an air-borne noise and a direct impact noise respectively measured by a microphone array and a sensor module array. The device, the method, and the system may provide a noise feedback for each household by analyzing and monitoring a noise level, a noise source location, a noise direction, an occurrence time, a noise type of a noise.

13 Claims, 15 Drawing Sheets

(56) References Cited

U.S. PATENT DOCUMENTS

2018/0313558 A1* 11/2018 Byers .................. F24F 11/89

FOREIGN PATENT DOCUMENTS

| KR | 2016-0000685 A | 1/2016 |
| KR | 2016-0099122 A | 8/2016 |

* cited by examiner

APPARATUS, METHOD AND MONITORING SYSTEM FOR MEASURING NOISE BETWEEN FLOORS

CROSS-REFERENCE TO RELATED APPLICATIONS

This application claims priority under 35 U.S.C. § 119 to Korean Patent Application No. 10-2018-0001463 filed on Jan. 5, 2018, in the Korean Intellectual Property Office, the disclosures of which are incorporated by reference herein in their entireties.

BACKGROUND

Embodiments of the inventive concept described herein relate to a device and a method for measuring a noise-between-floors, and a system for monitoring a noise-between-floors using the same, and more particularly, relate to a technique for analyzing and monitoring noise information and a noise type about a noise-between-floors using an air-borne noise and a direct impact noise as measured from a microphone array and a sensor module array respectively.

Due to a concentration and an overpopulation of a city resulting from a social development, a multi-storied building on which multi-generations live, such as a multi-unit dwelling and an apartment, has been popularized. This multi-storied building is a multiplex housing where multiple households are separated from each other through a wall and a floor interposed therebetween. Due to a nature of the multiplex housing, a complaint caused by a noise-between-floors occurs.

Especially, among the noise-between-floors, in case of an impact noise generated by a direct impact applied on the floor or the wall of the building, the noise-between-floors is easily transmitted to an adjacent household. Such noise is not only badly affecting mental and physical health of the adjacent households, but also causing a serious fight among neighbors. Thus, the noise has recently become a serious social problem.

Based on a survey, about 75% of the people live in the apartment or the multiplex housing (the multi-storied building), and 95% or more of them have been suffered from the noise-between-floors generated in the adjacent household.

Most of the prior arts for solving such problems are mostly related to a lamination of an anti-vibration material, and the like for relaxing the noise-between-floors on the floor of most buildings, and a cushioning material that appropriately forms an air layer.

However, the anti-vibration material or the cushioning material for relaxing the noise-between-floors has a limit to efficiently block the noise-between-floors.

SUMMARY

Embodiments of the inventive concepts provide a technique for providing a noise feedback for each household by analyzing and monitoring a noise level, a noise source location, a noise direction, an occurrence time, a noise type of a noise.

In addition, embodiments of the inventive concepts provide a technique for analyzing an air-borne noise and a direct impact noise respectively measured through a microphone array and a sensor module in a complementary manner, more accurately estimating noise information and a noise type, and obtaining an objective data using the same.

According to an exemplary embodiment, a noise-between-floors measuring device includes a microphone array including a plurality of microphones disposed on a substrate, wherein each microphone of the microphone array measures an air-borne noise detected at each position of each microphone, a sensor module array including a plurality of sensor modules disposed on the substrate, wherein each sensor module of the sensor module array measures a direct impact noise to each sensor module detected at each position of each sensor module, and a noise analyzing unit configured for analyzing both the air-borne noise and the direct impact noise in a complementary manner, for obtaining noise information about each noise based on the analysis result, and for estimating a noise type of a combination of the air-borne noise and the direct impact noise based on the noise information.

According to an exemplary embodiment, a noise-between-floors measuring system includes a noise-between-floors measuring device configured for measuring an air-borne noise and a direct impact noise respectively using a microphone array and a sensor module array disposed on a substrate, for analyzing both the air-borne noise and the direct impact noise in a complementary manner, and for obtaining noise information about each noise based on the analysis result, and for estimating a noise type of a combination of the air-borne noise and the direct impact noise based on the noise information and a server configured for receiving the noise information and the noise type from the noise-between-floors measuring device, and for monitoring a level of a noise-between-floors for each floor based on the noise information and the noise type.

According to an exemplary embodiment, a method for operating a noise-between-floors measuring device for analyzing noise information and a noise type includes measuring an air-borne noise detected in an air and a direct impact noise detected as a direct impact respectively using a microphone array and a sensor module, analyzing both the air-borne noise and the direct impact noise in a complementary manner for obtaining the noise information about each noise based on the analysis result, and for estimating the noise type of a combination of the air-borne noise and the direct impact noise among a plurality of noise types previously stored in a reference table based on the noise information.

According to an exemplary embodiment, a method for operating a noise-between-floors measuring system for analyzing noise information and a noise type, and monitoring a degree of a noise-between-floors includes measuring an air-borne noise detected in an air and a direct impact noise detected as a direct impact respectively using a microphone array and a sensor module, analyzing both the air-borne noise and the direct impact noise in a complementary manner for obtaining the noise information about each noise based on the analysis result, estimating the noise type of a combination of the air-borne noise and the direct impact noise among a plurality of noise types previously stored in a reference table based on the noise information, and monitoring a degree of a noise-between-floors for each household based on the noise information and the noise type.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
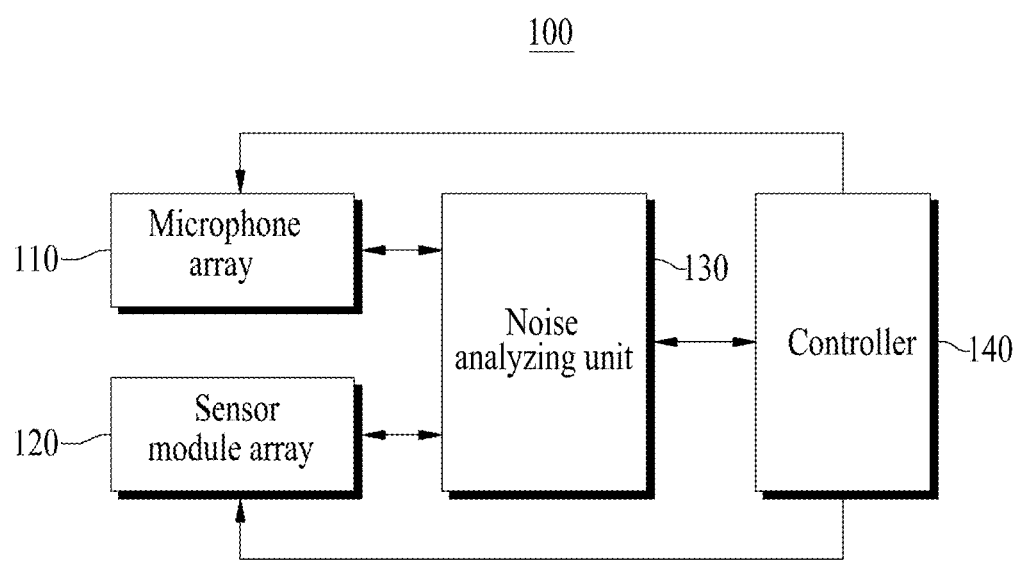
FIG. 1 is a block diagram of components of a noise-between-floors measuring device according to an embodiment of the inventive concept.

Hereinafter, embodiments according to the inventive concept will be described in detail with reference to the accompanying drawings. However, the inventive concept is not limited or restricted to embodiments. In addition, the same reference numerals shown in the drawings denote the same members.

In addition, the terminologies used in the specification are used for properly describing the preferred embodiments of the inventive concept. The terminologies may vary depending on an intention of an audience and an operator, or a practice of the field to which the inventive concept belongs. Thus, the definitions of the terminologies should be based on the contents throughout the specification.

FIG. 1 is a block diagram of components of a noise-between-floors measuring device according to an embodiment of the inventive concept.

With reference to FIG. 1, a noise-between-floors measuring device according to an embodiment of the inventive concept analyzes noise information and a noise type based on a noise-between-floors using an air-borne noise and a direct impact noise respectively measured from a microphone array and a sensor module array.

Accordingly, a noise-between-floors measuring device 100 according to an embodiment of the inventive concept includes a microphone array 110, a sensor module array 120, and a noise analyzing unit 130.

The microphone array 110 includes a plurality of microphones disposed on a substrate, wherein each microphone of the microphone array measures an air-borne noise detected at each position of each microphone.

The microphone array 110 may be a microphone array or a microphone sensor array for measuring a noise. The microphone array 110 may be formed on a front face of a wall-attaching type substrate, and may measure the air-borne noise using air-borne signal data detected in the air and a time of arrival of the air-borne signal data.

The microphone array 110 may include the plurality of microphones disposed on the substrate. For example, the microphones of the microphone array 110 may be arranged in a two-dimensional matrix or in a multidirectional three-dimensional matrix, or may be in an array of a predetermined distance on the front face of the substrate. The plurality of microphones of the microphone array 110 disposed on the front face of the substrate are arranged in different positions. Thus, the times at which a noise originating from a single sound wave enters the positions of the microphones are different except when there is no difference in distance from the sound wave to the positions of the microphones. Accordingly, an entering direction of the noise may be detected from a distance between the microphones of the microphone array 110 and an arrival time difference of the noise between the microphones of the microphone array 110.

In some embodiments, the noise-between-floors measuring device 100 according to an embodiment of the inventive concept may arrange and install six microphones of the microphone array 110 in the two-dimensional matrix so that a lower side noise entering from a lower direction side of a horizontal plane between a first row and a second row and an upper side noise entering from an upper direction side may be distinguished from each other. Then, a left side noise entering from a left direction side of a vertical plane of a second column and a right side noise entering from a right direction side may be distinguished. Accordingly, the noise-between-floors measuring device 100 according to an embodiment of the inventive concept may more accurately distinguish the noise direction and the position at 360 degrees. However, the number of the microphones of the microphone array 110 may be increased to more accurately acquire the entering direction of the noise, and the number of the microphones of the microphone array 110 may be decreased depending on a size and a volume to be applied, thus the number of the microphones is not limited thereto.

The sensor module array 120 includes a plurality of sensor modules disposed on the substrate, wherein each sensor module of the sensor module array 120 measures a direct impact noise to each sensor module detected at each location of each sensor module.

The sensor module array 120 may be a piezoelectric element (PZT) sensor. The sensor module array 120 may be formed on a rear face of the wall-attaching type substrate, and may measure the direct impact noise using impact signal data detected as the direct impact such as a pressure, a wall vibration, and the like and a time of arrival of the impact signal data.

The sensor module array 120 may include the plurality of sensor modules disposed on the substrate. For example, the sensor modules of the sensor module array 120 may be arranged in a two-dimensional matrix or in a multidirectional three-dimensional matrix, or may be in an array of a predetermined distance on the rear face of the substrate. The plurality of sensor modules of the sensor module array 120 disposed on the rear face of the substrate are arranged in different positions. Thus, the times at which a noise originating from a single sound wave enters the positions of the sensor modules are different except when there is no difference in distance from the sound wave to the positions of the sensor modules.

The sensor module array 120, which is the piezoelectric element sensor, is attached to a ceiling, the wall, the floor, and the like. A charge may be generated by the direct impact applied from the outside. Then, the sensor module array 120 may convert a response due to a vibration into a voltage signal, and output the voltage signal. Accordingly, the sensor module array 120 may receive the impact signal data from the vibration based on an intensity of the direct impact detected at each position of the sensor module. Then, the sensor module array 120 may detect the noise source location and the direction from a distance between the sensor modules of the sensor module array 120 and an arrival time difference of the noise between the sensor modules of the sensor module array 120.

In some embodiments, the noise-between-floors measuring device 100 according to an embodiment of the inventive concept may arrange and install four sensor modules of the sensor module array 120 in the two-dimensional matrix so that a lower side noise entering from a lower direction side of a horizontal plane between a first row and a second row and an upper side noise entering from an upper direction side may be distinguished from each other. Then, a left side noise entering from a left direction side of a vertical plane of a second column and a right side noise entering from a right direction side may be distinguished. Accordingly, the noise-between-floors measuring device 100 according to an embodiment of the inventive concept may more accurately distinguish the noise direction and the position at 360 degrees. However, the number of the sensor modules of the sensor module array 120 may be increased to more accurately acquire the entering direction of the noise, and the number of the sensor modules of the sensor module array 120 may be decreased depending on a size and a volume to be applied, thus the number of the sensor modules is not limited thereto.

The microphone array 110 and the sensor module array 120 of the noise-between-floors measuring device 100 according to an embodiment of the inventive concept may be formed in a patch structure by being connected to an integrated circuit (IC) formed on the substrate. The IC circuit may process a filtering, an amplification, a digitalization, and a processing function of the signal implementing an integration technique. In some embodiments, the IC circuit may be an integrated and multi-functional IC sensor (integrated circuit sensor) that processes the signal in the substrate. In this connection, the substrate may be made of a material detachable on the ceiling, the wall, and the floor of the building, so that a type, a shape and a form of the substrate are not limited.

The noise analyzing unit 130 analyzes the air-borne noise and the direct impact noise in a complementary manner for obtaining the noise information about each noise based on the analysis result, and for estimating the noise type of a combination of the air-borne noise and the direct impact noise based on the noise information.

For example, the noise analyzing unit 130 may use the air-borne noise and the direct impact noise to analyze the noise information including at least one of the noise level, the noise source location, the noise direction, and occurrence time of the noise, and to estimate the noise type of a combination of the air-borne noise and the direct impact noise based on the noise information.

The noise analyzing unit 130 receives the air-borne signal data and the time of arrival of the air-borne signal data, the impact signal data and the time of arrival of the impact signal data respectively detected by the microphone array 110 and the sensor module array 120. Then, the noise analyzing unit 130 may analyze the noise level from the time of arrival of the air-borne signal data and the time of arrival of the impact signal data based on a predetermined distance. The noise level refers to a noise magnitude, that is, a decibel (dB).

For example, the noise analyzing unit 130 may apply at least one of a high pass filter and a low pass filter to each of the air-borne signal data and the impact signal data, and measure the noise level in a frequency band of 30 Hz to 8 kHz, which is an occurrence band of the noise-between-floors. More specifically, the air-borne signal data and the impact signal data detected by each of the plurality of microphones of the microphone array 110 and the sensor modules of the sensor module array 120 may be received by the noise analyzing unit 130 through an amplifier. The noise analyzing unit 130 may amplify and sample the input signal data, change the input signal data into a frequency domain, and accumulate a weight for each frequency to measure the size of the signal. Thereafter, the noise analyzing unit 130 may apply the low pass filter to an RMS (root mean square) of the obtained signal, and measure the noise level based on a change of the noise level.

In this connection, the noise analyzing unit 130 may calculate a Sound Pressure Level (SPL) through a following [Equation 1], and measure the noise level.

$$SPL = 20 \log_{10} \frac{p}{p_0} (dB) \qquad \text{[Equation 1]}$$

In this connection, $p_0$ in the air is 20 µPa, which represents a threshold level of the noise.

Generally, there is an inherent noise-between-floors inducing a frequency for each building that exceeds a legal standard due to a difference of a natural frequency and a vibration transmission property, and induces the noise-between-floors. This noise-between-floors inducing the frequency, for example when an impact noise occurs in an upper layer, may be obtained by a measurement of the noise-between-floors, or may be obtained based on a known building property analysis technique. Accordingly, the noise analyzing unit 130 according to an embodiment of the inventive concept may block a living noise, which is not regarded as the noise-between-floors, and filter and pass only a constituent that substantially induce the noise-between-floors.

In some embodiments, the noise analyzing unit 130 may sample a sample of sufficient length to ensure an accuracy of a cross correlation coefficient. For example, a cross correlation may cause an arrival time difference of the signal to be detected by the plurality of microphones of the microphone array 110 and the plurality of sensor modules of the sensor module array 120, so that the accuracy may be lowered when too few samples are extracted. Accordingly, the noise analyzing unit 130 may acquire a cross correlation coefficient between digital noise signals extracted as the samples respectively for the microphone array 110 and the sensor module array 120, and may measure the times of arrival and the noise levels of the signal data.

The noise analyzing unit 130 may use a Time Difference of Arrival (TDoA) algorithm of the signal based on the time of arrival of the air-borne signal data and the time of arrival of the impact signal data respectively detected by the microphone array 110 and the sensor module array 120, and analyze the noise source location and the noise direction of the noise.

For example, the noise analyzing unit 130 may estimate the TDoA at all measurement angles based on the time of arrival of the air-borne signal data and the arrival time of the impact signal data respectively detected by the plurality of microphones of the microphone array 110 and the plurality of sensor modules of the sensor module array 120. Then, the noise analyzing unit 130 may analyze the position and direction in which the noise is generated. In some embodiments, when a distance d between the plurality of microphones of the microphone array 110 and between the plurality of sensor modules of the sensor module array 120 is 1 cm, the TDoA may be measured with a difference of 1 sample distance. Further, when a distance d between the plurality of microphones of the microphone array 110 and between the plurality of sensor modules of the sensor module array 120 is 4 cm, the TDoA may be measured with a difference of 4 sample distance. That is, when performing a 40 kHz sampling, the noise analyzing unit 130 may measure the noise source location and the noise direction at a 1 cm resolution.

The noise analyzing unit 130 may estimate the noise type from a reference table using the air-borne signal data and the impact signal data, wherein the reference table has a pattern corresponding to a noise type, wherein the pattern is generated by a machine learning using a data mining technique based on air-borne signal data and impact signal data.

The reference table may be a list of major noise types occupying approximately 95% of the total noises patterned through a sound classification technique. The sound classification technique may extract a feature of the noise, and classify each noise through a pre-process.

In this connection, the major noise types may include a children's running or walking sound, a hammering sound, a home appliance sound (a TV, a vacuum cleaner, a washing machine, and the like), a furniture sound (a sound generated by an act of dragging or punching), an instrument sound (a piano, a guitar, and the like), a conversation sound, a vibration sound (a mechanical vibration, and the like), a door opening/closing sound, a plumbing sound (a bathroom sound, a shower sound, and the like), an exercise equipment (a treadmill, a golf putting, and the like), an animal sound (a dog, a cat, and the like), a cooking sound at a kitchen, and the like. The major noise types and the number of the major noise type may not be limited thereto.

For example, the noise analyzing unit 130 may analyze and obtain the noise type from the at least one of the air-borne signal data, the time of arrival of the air-borne signal data, the impact signal data, the time of arrival of the impact signal data, the noise level, the noise source location, and the noise direction through the machine learning technique based on the reference table in which the patterns of the major noise types are analyzed and listed.

The noise analyzing unit 130 of the noise-between-floors measuring device 100 according to an embodiment of the inventive concept may analyze both of the air-borne noise and the direct impact noise in a complementary manner by collecting average values of the air-borne noise and the direct impact noise respectively measured from the microphone array 110 and the sensor module array 120, by assigning the weights based on a measurement situation, environment, or timing to the air-borne noise and the direct impact noise, or the like.

More specifically, the noise analyzing unit 130 may analyze the noise information, and estimate the noise type based on time for analyzing and measuring the noise (for example, morning time, afternoon time, late night time, and the like), a situation (for example, a holiday, a national holiday, weekdays, and the like), an environment (for example, a household with children or a household without children, an environment with a test-taker, and the like). In one embodiment, when it is the afternoon time on the weekday, the noise analyzing unit 130 may collect the average values of the air-borne noise and direct impact noise respectively obtained from the microphone array 110 and the sensor module array 120 to analyze the noise information, and may estimate the noise type of a combination of the air-borne noise and the direct impact noise based on the noise information. In another embodiment, when it is the night time of the holiday, the noise analyzing unit 130 may analyze the noise information of the air-borne noise and the direct impact noise respectively obtained from the microphone array 110 and the sensor module array 120 by adding a larger weight to the direct impact noise, and estimate the noise type.

That is, the noise-between-floors measuring device 100 according to an embodiment of the inventive concept may more accurately estimate the noise information and the noise type based on the timing, the situation, and the environment by analyzing both of the air-borne noise and the direct impact noise in a complementary manner, and may obtain objective data using the same.

The noise-between-floors measuring device 100 according to an embodiment of the inventive concept may further include a controller 140.

When each measured noise level exceeds a predetermined threshold value, the controller 140 may control the measurement of the air-borne noise and the direct impact noise respectively by the microphone array 110 and the sensor module array 120 via an event detector or a noise-based algorithm.

Generally, in the apartment or the multiplex housing (the multi-storied building), a living noise occurs in real time in addition to the noise-between-floors. Therefore, when performing the noise analysis for the all noises, an overload due to a high computing burden may occur. Thus, the noise-between-floors measuring device 100 according to an embodiment of the inventive concept may perform an initial analysis using the event detector or the noise-based algorithm.

For example, when the air-borne signal data and the impact signal data deviate from the specific threshold range, the controller 140 may use the event detector or the noise-based algorithm for performing the noise analysis such that the microphone array 110 and the sensor module array 120 may be waked-up to control the measurement of the air-borne noise and the direct impact noise, or the noise analysis unit 130 may be waked-up to control the noise information analysis and the estimation of the noise type.

When the noise information and the noise type may not be determined based on the air-borne noise and the direct impact noise, the controller 140 may transmit the air-borne noise and the direct impact noise to an external server through a communication module, and receive new noise information and a new noise type from the external server.

For example, when the type of the noise is not included in the reference table from a result of performing the machine learning by the noise analyzing unit 130, or when the noise analyzing unit 130 does not perform the machine learning, the controller 140 may transmit at least one of the air-borne signal data, the time of arrival of the air-borne signal data, the air-borne noise, the impact signal data, the time of arrival of the impact signal data, and the direct impact noise to the external server (not shown) through the communication module.

In the reference table, the patterns of the major noise types are analyzed and listed. Therefore, when any other noise occurs, the noise analyzing unit 130 may not be able to estimate the noise type. Accordingly, the noise-between-floors measuring device 100 according to an embodiment of the inventive concept may transmit the data received from the microphone array 110 and the sensor module array 120 to the external server, and receive the new noise information and the new noise type from the server.

More specifically, the server may analyze the new noise information and the new noise type through the machine learning, which is the data mining technique based on the at least one of the air-borne signal data, the time of arrival of the air-borne signal data, the air-borne noise, the impact signal data, the time of arrival of the impact signal data, and the direct impact noise. The server may transmit the analyzed new noise information and the new noise type, and a control command to the noise-between-floors measuring device 100.

The controller 140 of the noise-between-floors measuring device 100 according to an embodiment of the inventive concept may be configured to change or delete the pattern or add a new pattern in the reference table, based on the new noise information, the new noise type, and the control command as received from the server.

When the noise information and the noise type are deviate from a specific threshold range indicating a predetermined level of noise-between-floors, the controller 140 may be configured to transmit at least one output information of a warning alarm, and an alarm message based on the analysis result analyzed through the noise analyzing unit 130.

In an embodiment, the controller 140 may be configured to quantify the noise information and the noise type, and to display the quantified information and type on a wall-pad provided for each household or on a mobile device. When the noise level is out of a predetermined noise-between-floors level range, the controller 140 may transmit the noise feedback of the noise source location, the noise direction, and the noise type of the noise to be analyzed to the wall-pad in the measuring household (e.g. my home, or a user's home) or the mobile device possessed by the measuring household.

In another example, when the noise exceeds the degree of the noise-between-floors predetermined by the user (or the measuring household), the controller 140 may transmit the noise information and the noise type to the server, then the server may transmit the noise feedback to the wall-pad that is provided in the target household (upper floor or next door), or to the mobile device possessed by the target household. In some embodiments, the noise feedback may be transmitted in at least one of a numerical value, a value, a percentage, an image, a picture, a graph, a message, a voice, and a notification sound based on the noise information and the noise type. In addition, the noise feedback may be transmitted including a warning signal based on the noise level.

In this connection, the mobile device may be at least one of a smart phone, a tablet PC, and a PC, which is owned by a measuring household or a target household, and a type of the mobile device is not limited thereto.

In addition, the communication module may be a wireless data transport integrated circuit or a wireless data transport device. The communication module may be configured to implement any wired and/or wireless communication interface such that the noise-between-floors measuring device 100 may perform an information exchange with at least one of the external server, the wall-pad, and the mobile device. In some embodiments, the communication module may transmit and receive the data and the control command with different transmission bandwidths. In addition, at least one of a wireless method of a Zigbee, a Bluetooth, a LoRa, a Z-wave, a Wi-Fi, a Wi-Max, an IEEE 802.11, and a shared wireless access protocol (SWAP) may be applied to the communication module based on a coverage, but the wireless method is not limited thereto.

The noise-between-floors measuring device 100 according to an embodiment of the inventive concept may further include a power supply unit (not shown) and a memory unit (not shown).

The power supply unit may supply driving power to the microphone array 110, the sensor module array 120, the signal analyzing unit 130, the controller 140, and the communication module included in the noise-between-floors measuring device 100 according to an embodiment of the inventive concept. For example, the power supply unit may be composed of an active element using a subminiature charge/discharge battery or a subminiature super-capacitor. In some embodiments, the power supply unit may be a primary battery such as a coin battery, or a secondary battery such as a lithium-polymer battery. When the power supply unit is the secondary battery, the power supply unit may be charged by an external power source. Further, when the power supply unit is the primary battery such as the coin battery, the power supply unit may be replaced.

The memory unit performs a data logging of a long-time noise. The memory unit may include a high-speed random access memory, a magnetic disk, an SRAM, a DRAM, a ROM, a flash memory, or a non-volatile memory.

Figure 2A:
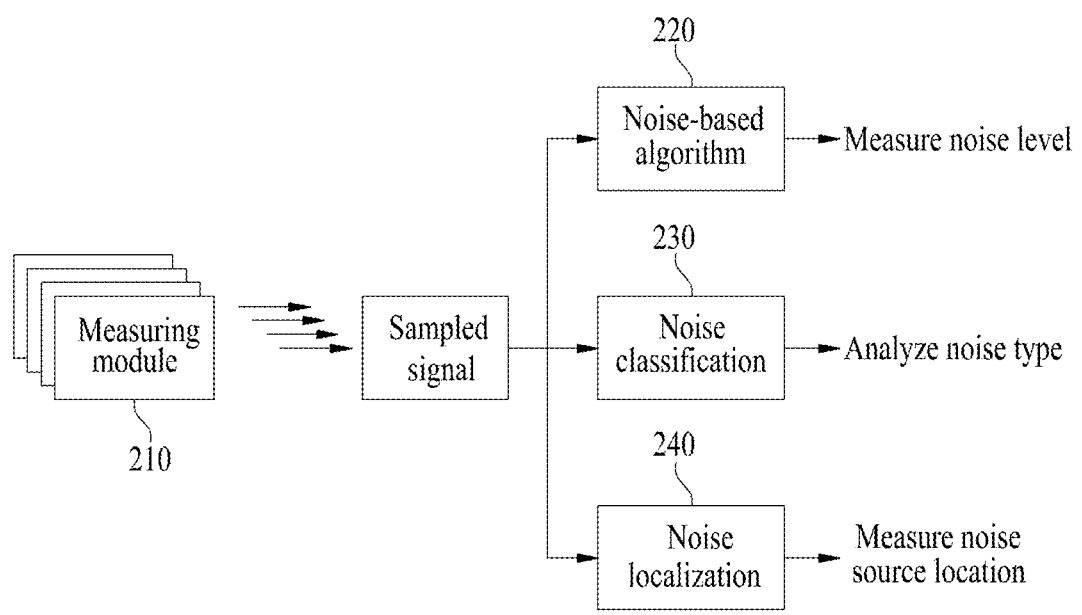
FIGS. 2A to 2C illustrate an example of an algorithm for analyzing a noise according to an embodiment of the inventive concept.
Figure 2B:
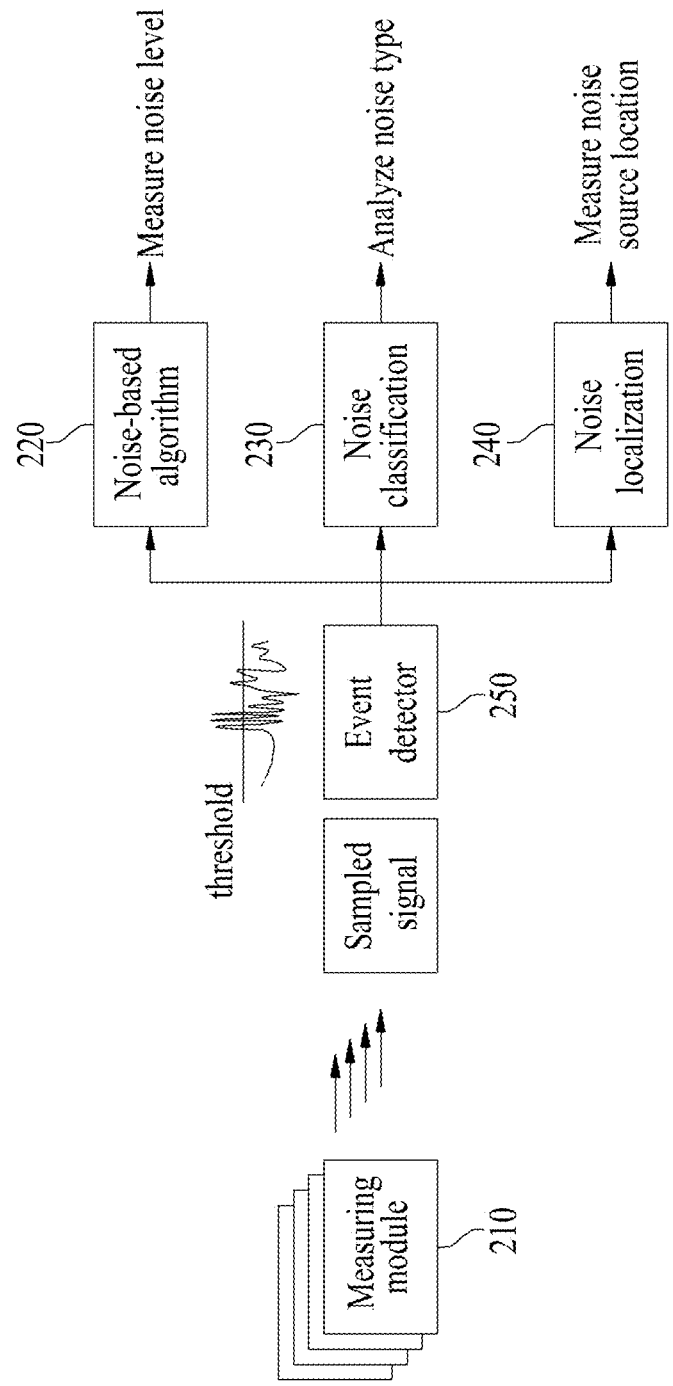
Figure 2C:
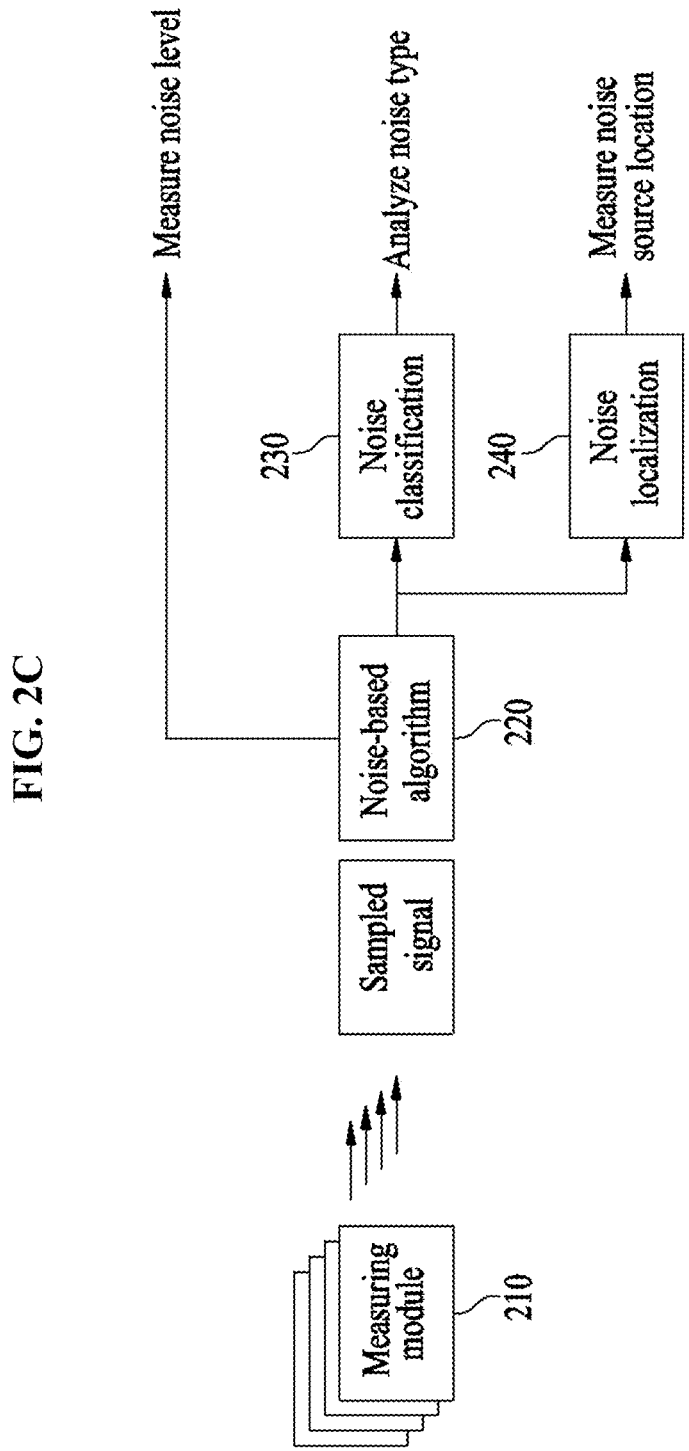

FIGS. 2A to 2C illustrate an example of an algorithm for analyzing a noise according to an embodiment of the inventive concept.

More specifically, FIG. 2A illustrates an example of an algorithm for analyzing a noise based on data detected from a measuring module. FIG. 2B illustrates an example of an algorithm for analyzing a noise using an event detector. FIG. 2C illustrates an example of an algorithm for analyzing a noise using a noise-based algorithm.

With reference to FIGS. 2A, 2B, and 2C, a measuring module 210 may be a microphone array or a sensor module array. The measuring module 210 may simultaneously detect air-borne signal data, which is a sound signal, and impact signal data, which is a vibration signal, and trigger an event. However, when the vibration and the sound are simultaneously detected, the direct impact noise may be determined, and then the air-borne noise based on the sound signal may be detected, and classified.

Generally, in the apartment or the multiplex housing (the multi-storied building), the living noise occurs in real time in addition to the noise-between-floors. Therefore, when performing the noise analysis for the all noises, the overload due to the high computing burden may occur. Thus, the noise-between-floors measuring device 100 according to an embodiment of the inventive concept may perform the initial analysis based on the predetermined specific threshold value.

With reference to FIG. 2A, when measuring a noise level, a noise type, and a noise direction using the sampled signal data (the vibration signal or the sound signal) obtained from the measuring module 210 including the microphone array and the sensor module array, the noise-between-floors measuring device 100 according to an embodiment of the inventive concept must measure the noise level, the noise type, and the noise direction using a noise-based algorithm 220, a noise classification algorithm 230, and a noise measurement algorithm 240 simultaneously. Therefore, the high computing burden is inevitable, and accordingly, the overload of the system may occur. Accordingly, the noise-between-floors measuring device 100 according to an embodiment of the inventive concept may solve the above problem using an event detector 250 or the noise-based algorithm 220.

With reference to FIG. 2B and FIG. 2C, when it is determined that the noise-between-floors exceeding the pre-determined threshold value has occurred, the noise-between-floors measuring device 100 according to an embodiment of the inventive concept may perform the post algorithms 220, 230, 240 using the event detector 250 or the noise-based algorithm 220 to estimate the noise level, the noise type, and the noise direction.

With reference to FIG. 2B, the noise-between-floors measuring device 100 according to an embodiment of the inventive concept compares the predetermined specific threshold value with the air-borne signal data and the impact signal data obtained from the measuring module 210 to distinguish the noise-between-floors and the living noise. When the noise is the noise-between-floors, the noise-between-floors measuring device 100 may include the event detector 250 for waking-up at least one of the microphone array, the sensor module array, and the noise analyzing unit. In this connection, when the noise-between-floors measuring device 100 uses the event detector 250, the sound pressure may be calculated only through the electrical signal.

More specifically, the event detector 250 receives the sampled signal data obtained from the measuring module 210. When the air-borne signal data or the impact signal data deviate from the specific threshold, the noise analyzing unit may perform the post algorithm 220, 230, 240 for the air-borne noise and the direct impact noise, and estimate the noise level, the noise type, and the noise direction. In some embodiments, the air-borne signal data and the impact signal data respectively detected in the microphone array and the sensor module array may be amplified through the amplifier, and sampled. Then, the event detector 250 may receive the sampled signal data.

With reference to FIG. 2C, the noise-between-floors measuring device 100 according to an embodiment of the inventive concept distinguishes the noise-between-floors and the living noise using the noise-based algorithm 220 capable of measuring the noise level. When the noise is the noise-between-floors, the noise-between-floors measuring device 100 may wake-up at least one of the microphone array, the sensor module array, and the noise analyzing unit. In this connection, when using the noise-based algorithm 220, the noises-between-floors may be distinguished based on the frequency at the same sound pressure.

More specifically, the noise-based algorithm 220 receives the sampled signal data obtained from the measuring module 210, and distinguishes the sound data of the noise-between-floors that real person feels as a noise. When the sound data is determined as the noise-between-floors, the noise analyzing unit measures the noise level using the noise-based algorithm 220 for the air-borne noise and the direct impact noise, and performs the noise classification algorithm 230, and the noise measurement algorithm 240 to estimate the noise type and noise direction of the noise.

Figure 3:
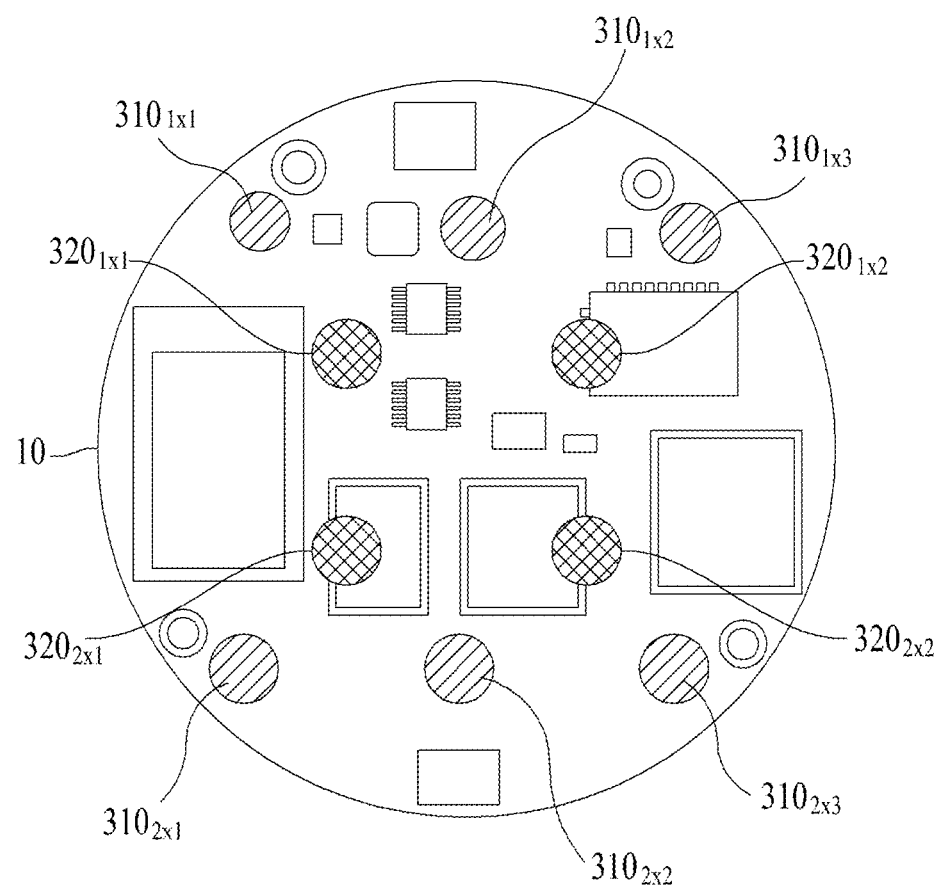
FIG. 3 illustrates an example of application of a noise-between-floors measuring device according to an embodiment of the inventive concept.

FIG. 3 illustrates an example of application of a noise-between-floors measuring device according to an embodiment of the inventive concept.

With reference to FIG. 3, the noise-between-floors measuring device 300 according to an embodiment of the inventive concept includes a plurality of microphones of a microphone array 310 and a plurality of sensor modules of a sensor module array 320 arranged in a two-dimensional matrix on the substrate 10. In this connection, the microphone array 310 is positioned on the front face of the substrate 10, and the sensor module array 320 is positioned on the rear face of the substrate 10. Accordingly, the microphone array 310 may measure the air-borne noise detected in the air, and the sensor module array 320 may measure the direct impact noise detected as the direct impact such as the pressure or the vibration on the wall.

In one embodiment, the plurality of microphone of the microphone array 310 and the plurality of the sensor module of the sensor module array 320 may be respectively arranged in a matrix of n rows and n columns, and may be arranged in a multidirectional matrix based on a predetermined distance d. In another embodiment, the plurality of microphone of the microphone array 310 and the plurality of the sensor module of the sensor module array 320 may be respectively arranged in a three-dimensional matrix. For example, when the number of the microphones of the microphone array 310 or the sensor modules of the sensor module array 320 is 5, four microphones of the microphone array 310 or sensor modules of the sensor module array 320 may be disposed on a plane of the substrate 10 while the other one microphone of the microphone array 310 or the sensor module of the sensor module array 320 may be positioned in a z-axis of the plane, for example, in a protruding form of the plane. Accordingly, the noise-between-floors measuring device 300 according to an embodiment of the inventive concept may improve the accuracy of the noise received from the multi-direction, and more accurately measure the source position of the noise based on the various arrangements in the two-dimension or three-dimension of the microphone array 310 and the sensor module array 320.

However, the number, the size, the position, or the arrangement of the microphone array 310 and the sensor module array 320 are not limited thereto, and may vary depending on various embodiments and environments.

In some embodiments, the number, the size, and the arrangement of the microphone array 310 and the sensor module array 320 shown in FIG. 3 are not limited thereto. The noise-between-floors measuring device 300 according to an embodiment of the inventive concept may further include at least one of a noise analyzing unit (not shown), a controller (not shown), a communication module (not shown), a power supply unit (not shown), and a memory unit (not shown).

Figure 4A:
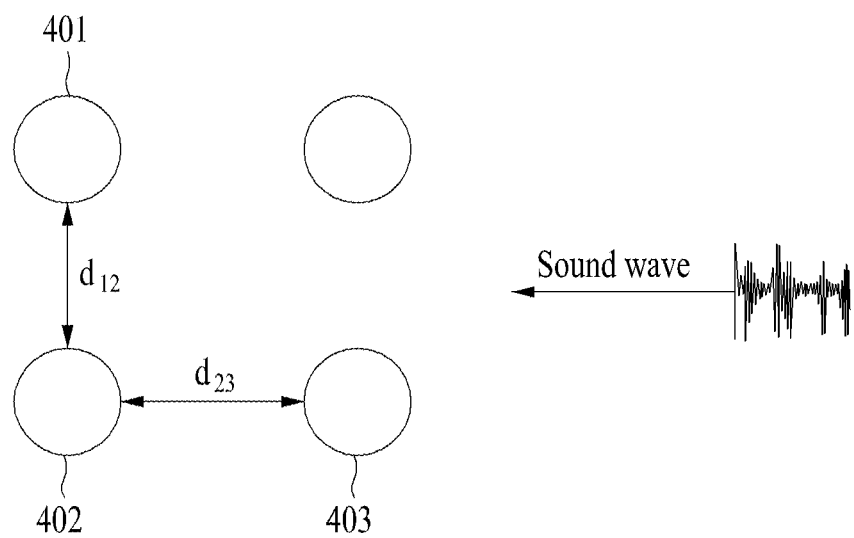
FIGS. 4A and 4B illustrate an example of a sound wave received by a measuring module according to an embodiment of the inventive concept.
Figure 4B:
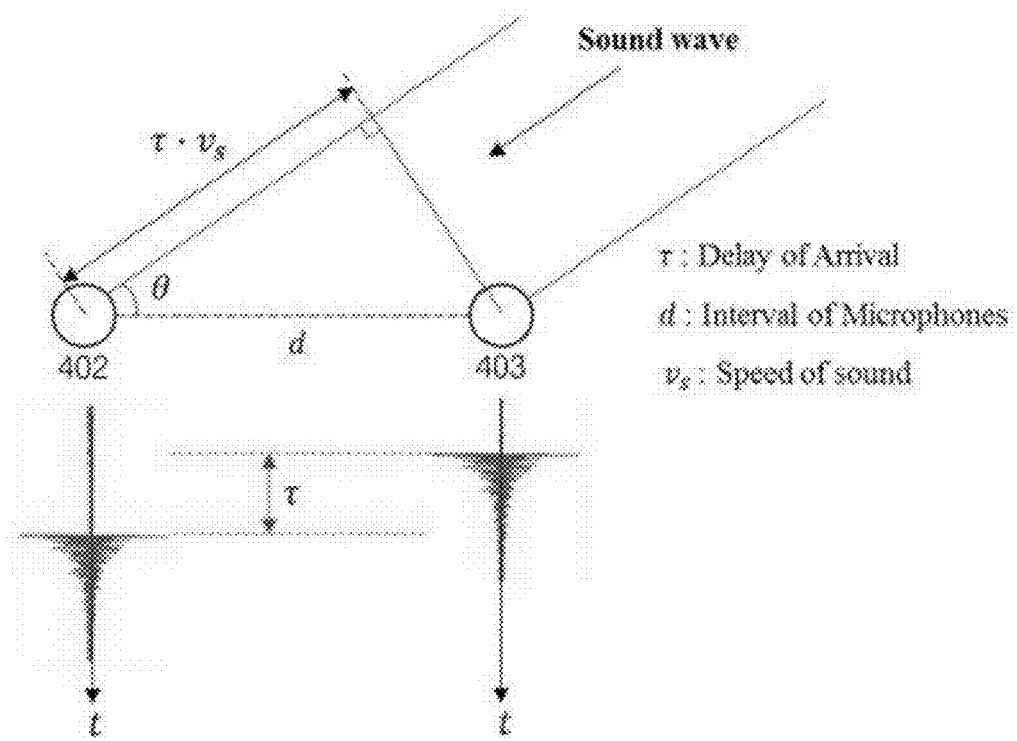
Figure 5:
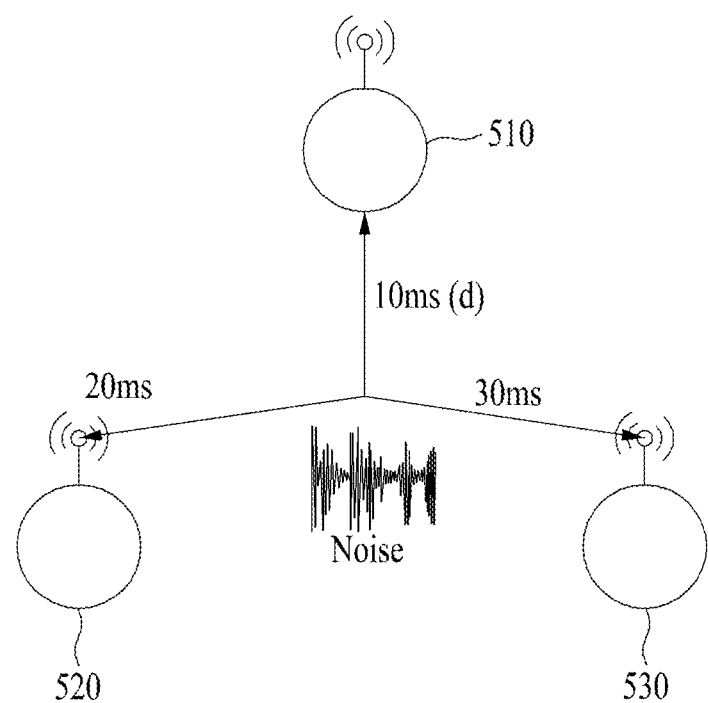
FIG. 5 shows an example of a sound wave received by a noise-between-floors measuring device according to an embodiment of the inventive concept.

FIGS. 4A and 4B illustrate an example of a sound wave received by a measuring module according to an embodiment of the inventive concept. FIG. 5 shows an example of a sound wave received by a noise-between-floors measuring device according to an embodiment of the inventive concept.

With reference to FIG. 4A, measuring modules 401, 402, 403 of a microphone array or a sensor module array are arranged in a predetermined distance d to sense a sound wave.

In some embodiments, a sound signal of the sound wave travels 340 m per second, and the time it takes to travel 1 cm may be about 0.029 ms. When this sound signal is sampled at 40 kHz, the time it takes may be about 0.025 ms. A noise-between-floors measuring device according to an embodiment of the inventive concept may estimate a direction and a position of the signal through a Time Difference of Arrival (TDoA) of the signal arriving at the measuring modules 401, 402, and 403.

For example, when a distance ($d_{12}$ or $d_{23}$) between the plurality of measuring modules 401, 402, and 403 is 1 cm, the TDoA may be measured with a difference of 1 sample distance. Further, when the distance ($d_{12}$ or $d_{23}$) between the plurality of measuring modules 401, 402, and 403 is 4 cm, the TDoA may be measured with a difference of 4 sample distance. That is, when performing a 40 kHz sampling, the noise-between-floors measuring device according to an embodiment of the inventive concept may measure the noise source location and the noise direction at a 1 cm resolution.

With reference to FIG. 4A again, it may be seen that the three measuring modules 401, 402, 403 represent an arrangement with one bend. Due to an arrangement of the measuring modules 401, 402, 403 positioned at end points or a bent point, the noise-between-floors measuring device according to an embodiment of the inventive concept may extend a range for estimating the direction of the sound wave to 360 degrees.

With reference to FIG. 4B, when the two measuring modules 402, 403 are positioned, three-dimensional angles may be calculated from alpha and beta as shown in [Equation 2].

$$\alpha = \cos^{-1}\left(\frac{TDOA_{mic1,2} \cdot v_s}{d_{mics}}\right), \beta = \cos^{-1}\left(\frac{TDOA_{mic3,4} \cdot v_s}{d_{mics}}\right) \quad \text{[Equation 2]}$$

In this connection, an angle θ in FIG. 4B represents $$\theta = \cos^{-1}\left(\frac{\tau_{delay} \cdot v_s}{d_{mics}}\right)$$

Accordingly, due to the arrangement shown in FIGS. 4A and 4B, even though sounds occur from the same sound wave, transmission channels for distances ($d_{12}$ and $d_{23}$) to reach the measuring modules 401, 402 and 403 are different from each other. Therefore, the sounds detected by each of the measuring modules 401, 402, and 403 may be different from each other, and output different electrical signals.

The noise-between-floors measuring device according to an embodiment of the inventive concept may analyze the noise direction based on the signal data and the time of arrival of the signal data respectively received from the measuring modules 401, 402, 403 by arranging the measuring modules 401, 402, 403 in the three-dimension, not the two-dimension in order for selecting points with the angles of alpha and the beta.

With reference to FIG. 5, a plurality of noise-between-flood measuring devices 510, 520, and 530 respectively positioned at distances of 10 ms, 20 ms, and 30 ms from a noise. In addition, the plurality of noise-between-floors measuring devices 510, 520, 530 receive the noise. When the noise is measured using the plurality of noise-between-floors measuring devices 510, 520, and 530 positioned at different distances, a noise source location and a noise direction may be measured with a high resolution through a TDoA algorithm.

Through the process of receiving the sound wave as shown in FIG. 4A, FIG. 4B, and FIG. 5, the noise-between-floors measuring device according to an embodiment of the inventive concept may estimate the noise source location and the noise direction, and determine whether the noise is generated in the measuring household or in the target household (the upper floor or the next door). This determination may be done by learning about a noise generated in the room, and a noise generated from the upper floor or the next door, or by comparing the noise with the reference table. In addition, the noise-between-floors measuring device according to an embodiment of the inventive concept may combine the signal data and the time difference of arrival of the signal data to improve the accuracy of the measurement such that the noise-between-floors measuring device may more accurately estimate the direction and the location of the noise.

Figure 6:
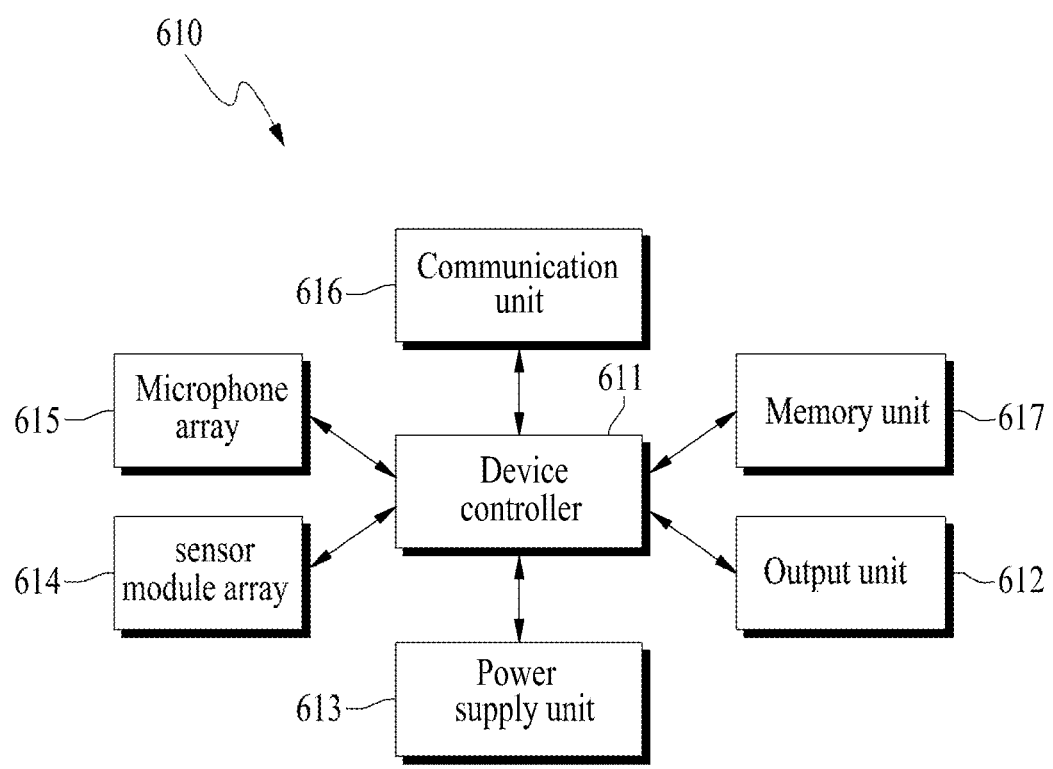
FIG. 6 illustrates detailed components of a noise-between-floors measuring device according to an embodiment of the inventive concept.

FIG. 6 illustrates detailed components of a noise-between-floors measuring device according to an embodiment of the inventive concept.

FIG. 6 is only an example of a noise-between-floors measuring device 610. The noise-between-floors measuring device 610 may include more or fewer components than illustrated components, and may combine two or more components, or may include a configuration or an arrangement that include different components.

In addition, the components shown in FIG. 6 may be implemented in a hardware including an integrated circuit that is specialized for one or more signals, a software, or a combination of both hardware and software. Terms such as "-unit", and the like to be used below refer to a unit for processing at least one function or operation, which may be implemented in a hardware, a software, or a combination of both hardware and software.

With reference to FIG. 6, the noise-between-floors measuring device 610 according to an embodiment of the inventive concept includes a device controller 611, an output unit 612, a power supply unit 613, a sensor module array 614, a microphone array 615, and a communication unit 616. In this connection, the device controller 611 may include the noise analyzing unit 130 and the controller 140 shown in FIG. 1, the sensor module array 614 may be a combination of the sensor modules of the sensor module array 120, and the microphone array 615 may be a combination of the microphones of the microphone array 110.

The sensor module array 614 may include a plurality of sensor modules disposed on a substrate, wherein each sensor module of the sensor module array 614 measures a direct impact noise sensed by a direct impact at each position, and the microphone array 615 may include a plurality of microphones disposed on the substrate, wherein each microphone of the microphone array 165 measures an air-borne noise sensed at each position of each microphone.

The device controller 611 may analyze both the air-borne noise and the direct impact noise respectively received from the sensor module array 614 and the microphone array 615 in a complementary manner for obtaining noise information about each noise based on the analysis result, and for estimating a noise type of a combination of the air-borne noise and the direct impact noise based on the noise information. In addition, when the noise exceeds a predetermined threshold value, the device controller 611 may control the measurement of the air-borne noise and the direct impact noise by the microphone array and the sensor module array using an event detector or a noise-based algorithm.

The device controller 611 may include a processor, a central processing unit, an application processor, or a communication processor, and may control an operation of the noise-between-floors measuring device 610 performed by the output unit 612, the power supply unit 613, the sensor module array 614, the microphone array 615, and the communication unit 616.

In one embodiment, the device controller 611 may perform an operation or a data processing related to a control and/or a communication of the at least one other component of the noise-between-floors measuring device 610.

The output unit 612 may include a display module, an audio module, a speaker module, and a vibration module. In some embodiments, the output unit 612 may display a content image including a plurality of items respectively positioned in a plurality of areas using the display module, output a warning sound using the audio module, the speaker module, or a buzzer, turn a warning light on using a Light Emitting Diode (LED), or output a vibration using the vibration module.

The power supply unit 613 may supply driving power to the device controller 611, the output unit 612, the sensor module array 614, the microphone array 615, and the communication unit 616 included in the noise-between-floors measuring device 610.

The communication unit 616 may be a wireless data transport integrated circuit or a wireless data transport device. The communication unit 616 may be configured to implement any wired and/or wireless communication interface such that the noise-between-floors measuring device may perform an information exchange with at least one of an external server, a wall-pad, and a mobile device. In some embodiments, the communication unit 616 may transmit and receive data and control command with different transmission bandwidths. In addition, at least one of a wireless method of a Zigbee, a Bluetooth, a LoRa, a Z-wave, a Wi-Fi, a Wi-Max, an IEEE 802.11, and a shared wireless access protocol (SWAP) may be applied to the communication unit 616 based on a coverage, but the wireless method is not limited thereto.

The memory unit 617 performs a data logging of a long-time noise. The memory unit 617 may include a high-speed random access memory, a magnetic disk, an SRAM, a DRAM, a ROM, a flash memory, or a non-volatile memory.

The memory unit 617 may include a software module, a set of instructions, or various other data required for an operation of the noise-between-floors measuring device 610. In one embodiment, the memory unit 617 may store and maintain the direct impact noise and the air-borne noise respectively received from the sensor module array 614 and the microphone array 615 for a long time. The air-borne noise and the direct impact noise may be stored and maintained in a customized history for each layer, time, and user's set-up.

In addition, an access to the memory unit 617 may be controlled by other components, such as the device controller 611 and a peripheral device interface, and may be transmitted to the external server, the wall-pad, and the mobile device via the communication unit 616.

Figure 7A:
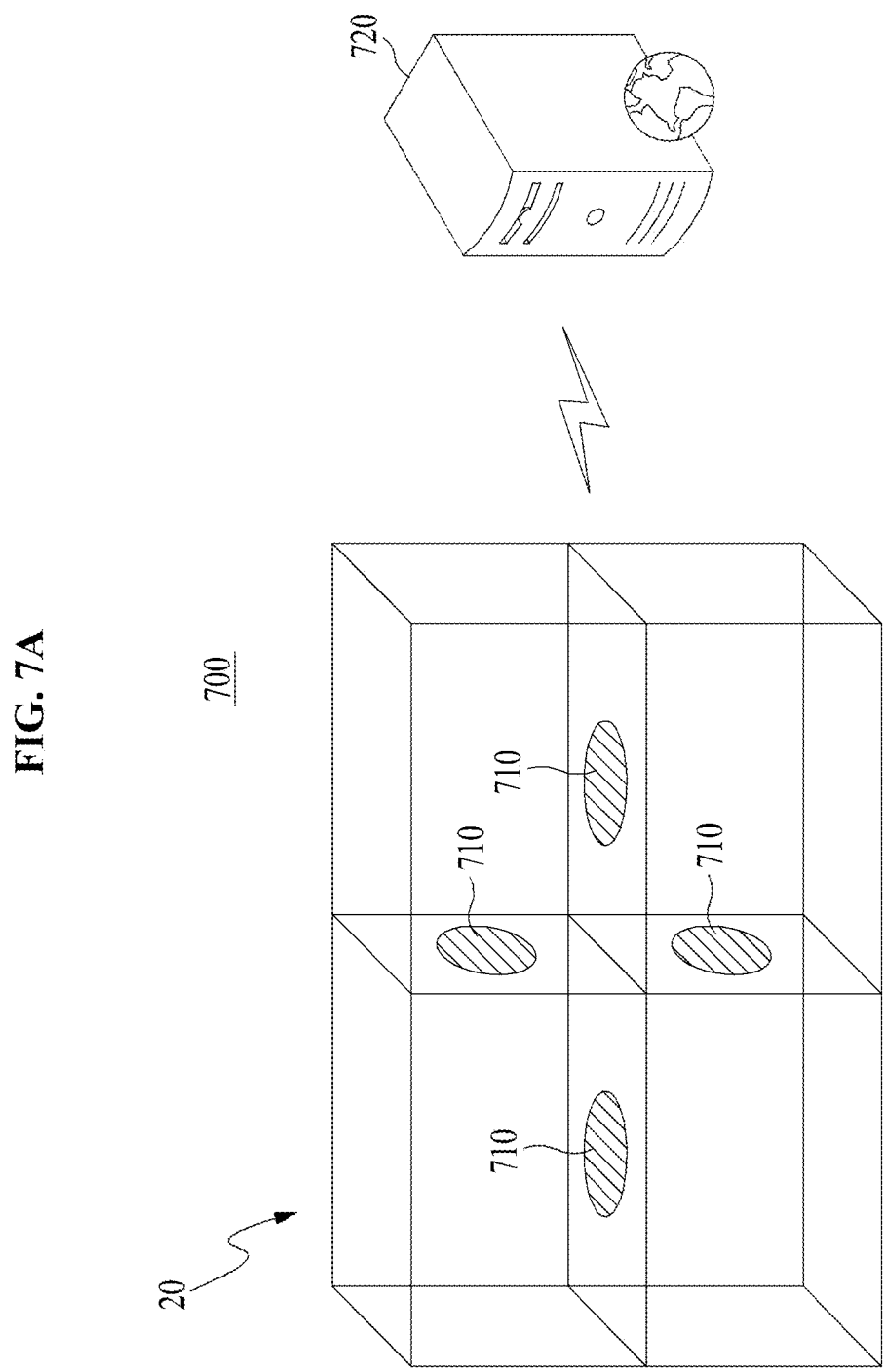
FIGS. 7A and 7B illustrate a configuration of a noise-between-floors measuring system according to an embodiment of the inventive concept.
Figure 7B:
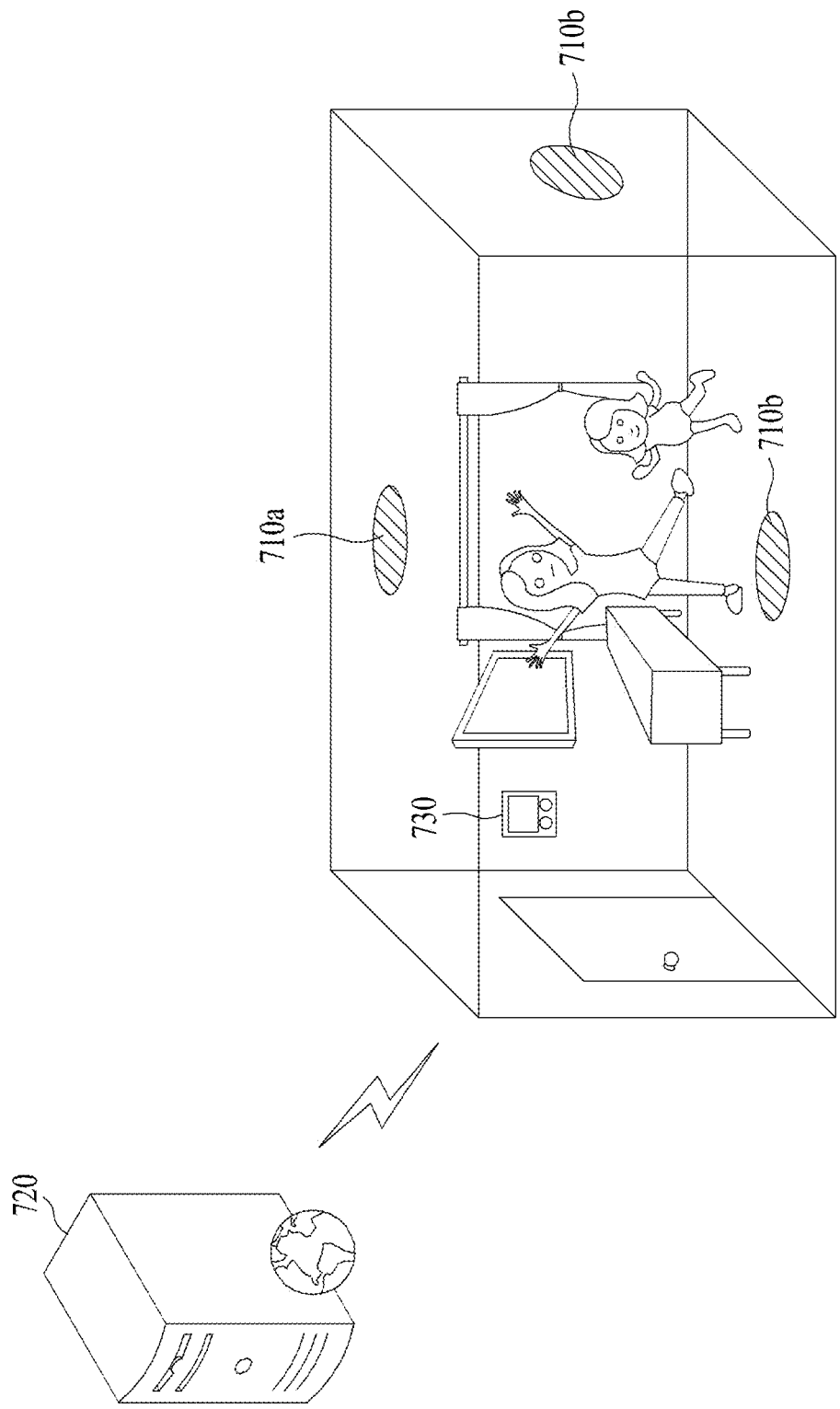

FIGS. 7A and 7B illustrate a configuration of a noise-between-floors measuring system according to an embodiment of the inventive concept.

More specifically, FIG. 7A illustrates a configuration of a noise-between-floors measuring system according to an embodiment of the inventive concept. In addition, FIG. 7B illustrates an example of application of a noise-between-floors measuring system according to an embodiment of the inventive concept.

With reference to FIG. 7A, a noise-between-floors measuring system according to an embodiment of the inventive concept receives noise information and a noise type from a noise-between-floors measuring device, and monitors a degree of a noise-between-floors of each household.

To this end, a noise-between-floors measuring system 700 according to an embodiment of the inventive concept includes a noise-between-floors measuring device 710 installed in an apartment or a multiplex housing 20 and a server 720.

The noise-between-floors measuring device 710 of the noise-between-floors measuring device 700 according to an embodiment of the inventive concept may transmit and receive data or a control command to/from the external server 720 via a network. In some embodiments, the noise-between-floors measuring device 710 may transmit and receive the data or the control command to/from a mobile device or a wall-pad 730 in addition to the server 720.

The noise-between-floors measuring device 710 respectively measures an air-borne noise and a direct impact noise using a microphone array and a sensor module array disposed on a substrate, analyzes both the air-borne noise and the direct impact noise in a complementary manner for obtaining noise information about each noise based on the analysis result, and for estimating a noise type of a combination of the air-borne noise and the direct impact noise based on the noise information.

A detailed description of the noise-between-floors measuring device 710 has been described above with reference to FIGS. 1 to 6, therefore will not be described below.

The server 720 monitors the degree of the noise-between-floors of each household based on the noise information and the noise type of the noise received from the noise-between-floors measuring device 710.

In one embodiment, the server 720 may transmit a noise feedback to the wall-pad 730 that is provided in a target household where the noise occurs and the mobile device based on the noise information and the noise type received from the noise-between-floors measuring device 710. For example, the server 720 compares the noise with a predetermined noise-between-floors degree (or a specific threshold value) based on a noise level, a noise source location, a noise direction, occurrence time, and the noise type received from the noise-between-floors measuring device 710. When the noise exceeds a range, the server 720 may provide information about the noise level, the noise direction, and the noise type in at least one of a numerical value, a value, a percentage, an image, a picture, a graph, a message, a voice to the wall-pad 730 that is provided for each household, or to the mobile device possessed by a user for each household. In some embodiments, an alarm signal including at least one of a warning message, an alarm, a voice, a light, and a vibration may be provided.

In another embodiment, the server 720 may store and maintain the noise information and the noise type for each household based on the data received from the noise-between-floors measuring device 710.

When the noise-between-floors measuring device 710 may not determine the noise information and the noise type based on the air-borne noise and the direct impact noise, the server 720 may analyze new noise information and a new noise type using a machine learning.

For example, when the noise-between-floors measuring device 710 fails to estimate the noise information and the noise type of the noise, or when an estimation accuracy is low, the server 720 may receive at least one of air-borne signal data, time of arrival of the air-borne signal data, the air-borne noise, impact signal data, time of arrival of the impact signal data, and the direct impact noise from the noise-between-floors measuring device 710, and analyze the new noise information and the new noise type through the machine learning, which is a data mining technique.

Thereafter, the server 720 may transmit the new noise information and the new noise type as analyzed and a control command to the noise-between-floors measuring device 710. In response, the noise-between-floors measuring device 710 may be configured to change or delete the patterns or add a new pattern in the reference table based on the new noise information and the new noise type. For example, when frequencies or intensities of the new noise information and the new noise type increases or become stronger, the server 720 may control the noise-between-floors measuring device 710 to add a pattern to the reference table. Further, the server 720 may identify frequencies and intensities of the noise types that are previously learned and listed, and control the device 710 to delete patterns of some noise types from the table.

Accordingly, the noise-between-floors measuring system 700 according to an embodiment of the inventive concept may maintain a constant amount of data based on the noise type stored in the reference table in the noise-between-floors measuring device 710 to minimize an overload resulting from a transmission/reception of the data.

The server 720 of the noise-between-floors measuring system 700 according to an embodiment of the inventive concept may transmit the control command input by the user to the noise-between-floors measuring device 710. The control command may include at least one of an operation on/off, a change of a communication period, a reference table control of the noise-between-floors measuring device 710.

In some embodiments, the server 720 may be at least one of a management office, a noise-between-floors management sensor, a noise-between-floors management server, and a housing management server, but is not limited thereto. In addition, the server 720 may be a server that manages and monitors the noise-between-floors. In addition, the server 720 may further provide services for managing various noise-between-floors in addition to the above-described services, and may establish a database accordingly, or may be based on a communication with another external server.

With reference to FIG. 7B, the noise-between-floors measuring system 700 according to an embodiment of the inventive concept may include a noise-between-floors measuring device 710a attached to a ceiling of an apartment or a multiplex housing 20, a noise-between-floors measuring device 710b attached to a wall, and a noise-between-floors measuring device 710c attached to a floor. However, the number of the noise-between-floors measuring device 710, an attaching face, and an attaching form are not limited thereto.

The noise-between-floors measuring device 710 may be provided for each household to measure the noise-between-floors. The noise-between-floors measuring device 710 may compare the noise with the predetermined noise-between-floors degree based on the analyzed noise level, noise source location, noise direction, occurrence time, and noise type. When the noise exceeds the certain threshold value, the data or the noise feedback may be provided to the server 720 or the wall-pad 730.

The server 720 may transmit the noise feedback to the target household (upper floor or next door) where the noise is generated based on the noise information and the noise type received from the noise-between-floors measuring device 710. For example, the noise-between-floors measuring device 710 may detect a noise from a second floor 202 based on measured noise level, noise source location, noise direction, occurrence time, and noise type measured in a household of a first floor 201, and transmit the detected noise information and the noise type to the server 720. In this connection, the server 720 may transmit a noise feedback to the wall-pad 730 in the target household of the second floor 202, or to the mobile device possessed by the target household based on the received information. The noise feedback may be transmitted in at least one of a numerical value, a value, a percentage, an image, a picture, a graph, a message, a voice, and a notification sound based on the noise information and the noise type. In addition, the noise feedback may be transmitted including a warning signal based on the noise level.

The wall-pad 730 shown in FIG. 7B receives the data from the noise-between-floors measuring device 710 or the server 720. Then, the wall-pad 730 may display or output at least one of household information based on the noise source location and the noise direction, the noise level, the occurrence time, and the noise type in the numerical value, the value, the percentage, the image, the picture, the graph, the message, the voice, and the notification sound.

Figure 8A:
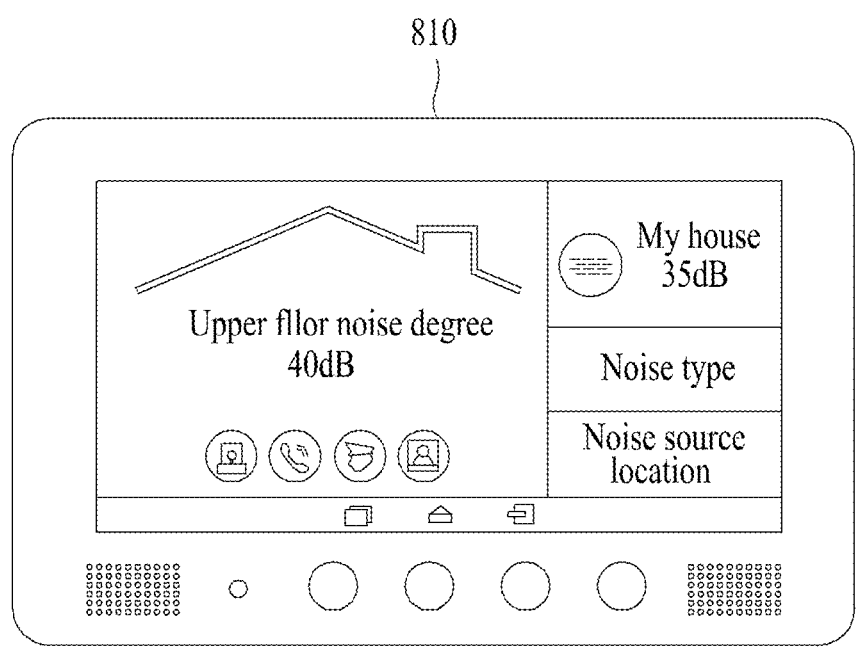
FIGS. 8A and 8B illustrate an example of a noise feedback.
Figure 8B:
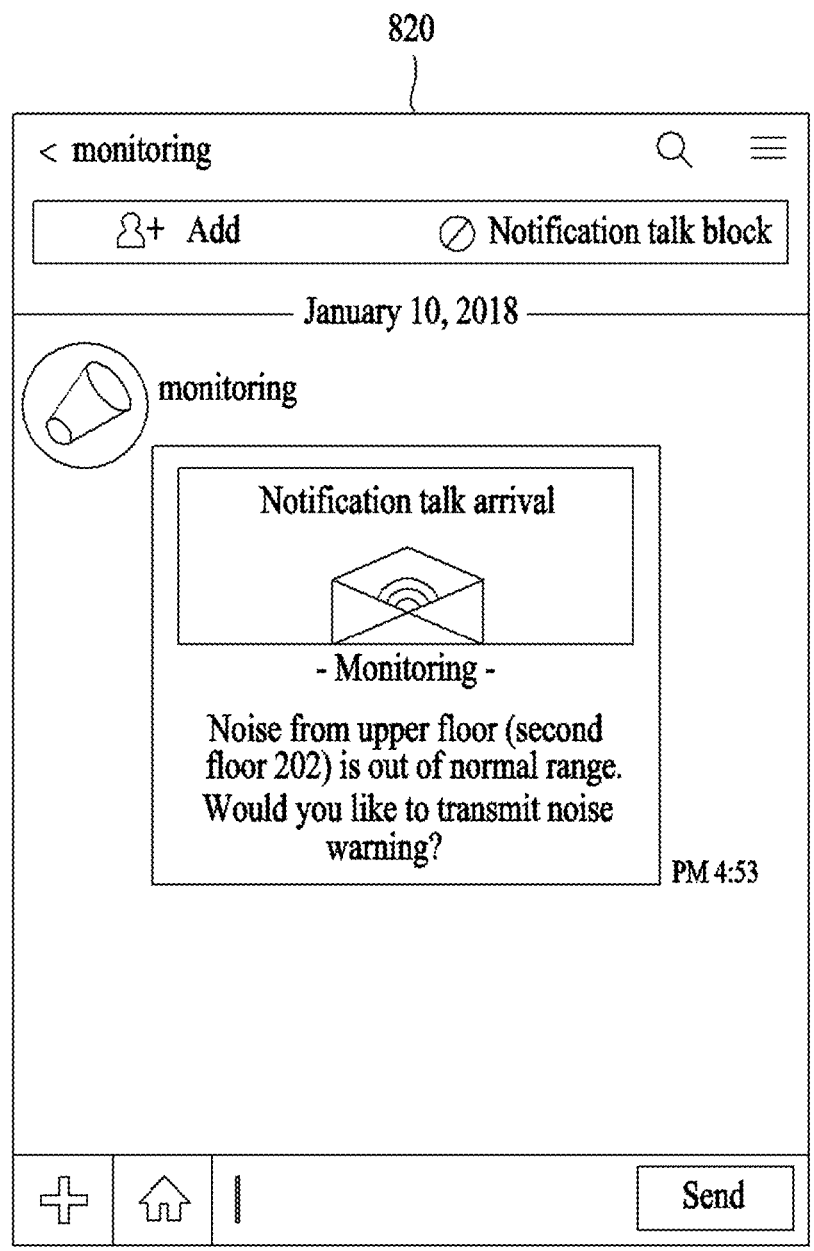

FIGS. 8A and 8B illustrate an example of a noise feedback.

More specifically, FIG. 8A illustrates an example of a wall-pad that outputs a noise feedback. FIG. 8B illustrates an example of a mobile device that outputs a noise feedback.

With reference to FIG. 8A, a wall-pad 810 installed in an apartment or a multiplex housing may output a noise feedback based on noise information and a noise type received from at least one of a noise-between-floors measuring device, a server and a mobile device 820 via a network. The wall-pad 810 may objectively compare a degree of a noise generated in a measuring household (a user house) and a degree of a noise generated in a target household (an upper floor or a next door), and monitor and output the compared result.

With reference to FIG. 8B, the mobile device 820 possessed by the user (the measuring household or the target household) may output the noise feedback based on noise information and a noise type received from at least one of the noise-between-floors measuring device, the server, and the wall-pad 810 via the network.

For example, the noise-between-floors measuring device or the server may compare the noise with a specific threshold value, which is a predetermined noise-between-floors degree based on noise information and a noise type based on an air-borne noise and a direct impact noise. When the noise information and the noise type deviate from the specific threshold range, the noise feedback may be provided to at least one of the wall-pad 810 and the mobile device 820.

In some embodiments, the noise feedback may be transmitted in a message as shown in FIGS. 8A and 8B, but may also be transmitted in at least one of an alarm, a vibration, a light, and a voice. In this connection, an application for various application functions may be installed in the wall-pad 810 and the mobile device 820. The wall-pad 810 and the mobile device 820 may communicate with the server or the noise-between-floors measuring device using the installed application.

Figure 9:
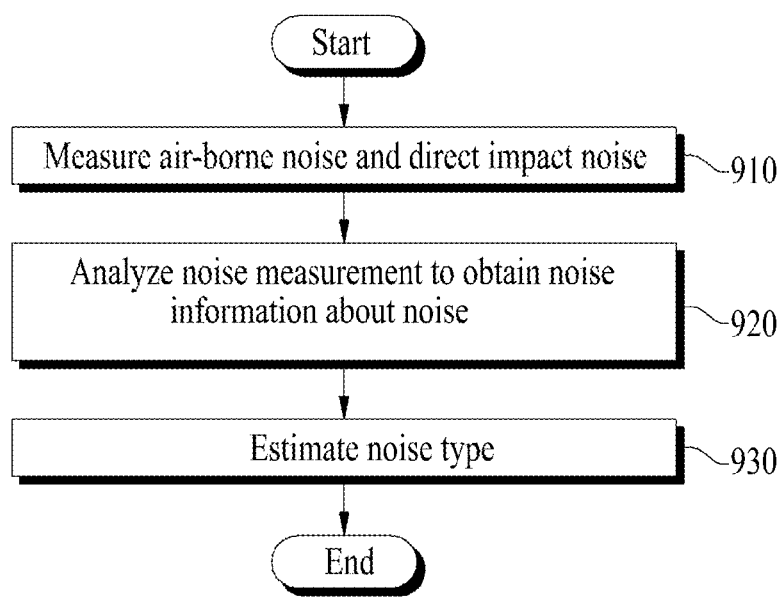
FIG. 9 illustrates a flowchart of a method for operating a noise-between-floors measuring device according to an embodiment of the inventive concept.

FIG. 9 illustrates a flowchart of a method for operating a noise-between-floors measuring device according to an embodiment of the inventive concept.

A method illustrated in FIG. 9 may be performed by the noise-between-floors measuring device according to an embodiment of the inventive concept illustrated in FIG. 1.

With reference to FIG. 9, in an operation 910, the microphone array and the sensor module array disposed on the substrate is used to measure the air-borne noise detected in the air and the direct impact noise detected as the direct impact.

For example, the microphone array may be the microphone array or the microphone array sensor for measuring the noise. The microphone array may be formed on the front face of the wall-attaching type substrate, and may measure the air-borne noise using the air-borne signal data and the time of arrival of the air-borne signal data detected in the air. In addition, the sensor module array may be the piezoelectric element (PZT) sensor. The sensor module array may be formed on the rear face of the wall-attaching type substrate, and may measure the direct impact noise using the impact signal data and the time of arrival of the impact signal data detected as the direct impact such as the pressure, the wall vibration, and the like.

In an operation 920, the air-borne noise and the direct impact noise are analyzed in a complementary manner for obtaining the noise information about each noise based on the analysis result.

For example, the operation 920 may analyze the noise information including at least one of the noise level, noise source location, the noise direction, and the occurrence time of the noise using the air-borne noise and the direct impact noise respectively received by the microphone array and the sensor module array.

In some embodiments, in the operation 920, a method according to an embodiment of the inventive concept may analyze the noise level from the time of arrival of the air-borne signal data and the time of arrival of the impact signal data respectively measured by the microphone array and the sensor module array. In addition, the method may analyze the noise source location and the noise direction of the noise using the Time Difference of Arrival (TDoA) algorithm based on the time of arrival of the air-borne signal data and the time of arrival of the impact signal data.

In an operation 930, the noise type of the noise among the plurality of noise types previously stored in the reference table is estimated based on the noise information.

In the operation 930, the noise type of the noise in the reference table may be estimated using the air-borne signal data and the impact signal data, wherein the reference table has a pattern corresponding to a noise type, wherein the pattern is generated by a machine learning using a data mining technique based on air-borne signal data and impact signal data.

The reference table may be the list of the top types of the noise occupying approximately 95% of the total noises patterned through the sound classification technique. The sound classification technique may extract the feature of the noise, and classify each noise through the pre-process.

In this connection, the major noise types may include the children's running or walking sound, the hammering sound, the home appliance sound (the TV, the vacuum cleaner, the washing machine, and the like), the furniture sound (the sound generated by the act of dragging or punching), the instrument sound (the piano, the guitar, and the like), the conversation sound, the vibration sound (the mechanical vibration, and the like), the door opening/closing sound, the plumbing sound (the bathroom sound, the shower sound, and the like), the exercise equipment (the treadmill, the golf putting, and the like), the animal sound (the dog, the cat, and the like), the cooking sound at the kitchen, and the like. The major noise types and the number of the major noise type may not be limited thereto.

Figure 10:
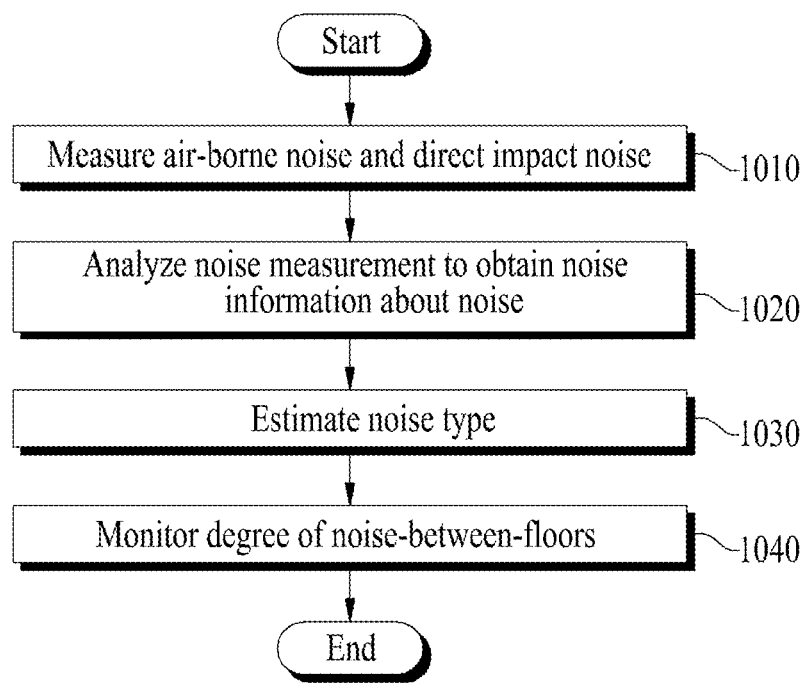
FIG. 10 illustrates a flowchart of a method for operating a noise-between-floors measuring system for monitoring a degree of a noise-between-floors according to an embodiment of the inventive concept.

FIG. 10 illustrates a flowchart of a method for operating a noise-between-floors measuring system for monitoring a degree of a noise-between-floors according to an embodiment of the inventive concept.

A method illustrated in FIG. 10 may be performed by the noise-between-floors measuring system according to an embodiment of the inventive concept illustrated in FIG. 7A.

With reference to FIG. 10, in an operation 1010, the microphone array and the sensor module array disposed on the substrate is used to measure the air-borne noise detected in the air and the direct impact noise detected as the direct impact.

For example, the microphone array may be the microphone array or the microphone array sensor for measuring the noise. The microphone array may be formed on the front face of the wall-attaching type substrate, and may measure the air-borne noise using the air-borne signal data and the time of arrival of the air-borne signal data detected in the air. In addition, the sensor module array may be the piezoelectric element (PZT) sensor. The sensor module array may be formed on the rear face of the wall-attaching type substrate, and may measure the direct impact noise using the impact signal data and the time of arrival of the impact signal data detected as the direct impact such as the pressure, the wall vibration, and the like.

In an operation 1020, the air-borne noise and the direct impact noise are analyzed in a complementary manner for obtaining the noise information about each noise based on the analysis result.

For example, the operation 1020 may analyze the noise information including at least one of the noise level, noise source location, the noise direction, and the occurrence time of the noise using the air-borne noise and the direct impact noise respectively received by the microphone array and the sensor module array.

In some embodiments, in the operation 1020, a method according to an embodiment of the inventive concept may analyze the noise level from the time of arrival of the air-borne signal data and the time of arrival of the impact signal data respectively measured by the microphone array and the sensor module array. In addition, the method may analyze the noise source location and the noise direction of the noise using the Time Difference of Arrival (TDoA) algorithm based on the time of arrival of the air-borne signal data and the time of arrival of the impact signal data.

In an operation 1030, the noise type of the noise among the plurality of noise types previously stored in the reference table is estimated based on the noise information.

In the operation 1030, the noise type of the noise in the reference table may be estimated using the air-borne signal data and the impact signal data, wherein the reference table has a pattern corresponding to a noise type, wherein the pattern is generated by a machine learning using a data mining technique based on air-borne signal data and impact signal data.

The reference table may be the list of the top types of the noise occupying approximately 95% of the total noises patterned through the sound classification technique. The sound classification technique may extract the feature of the noise, and classify each noise through the pre-process.

In this connection, the major noise types may include the children's running or walking sound, the hammering sound, the home appliance sound (the TV, the vacuum cleaner, the washing machine, and the like), the furniture sound (the sound generated by the act of dragging or punching), the instrument sound (the piano, the guitar, and the like), the conversation sound, the vibration sound (the mechanical vibration, and the like), the door opening/closing sound, the plumbing sound (the bathroom sound, the shower sound, and the like), the exercise equipment (the treadmill, the golf putting, and the like), the animal sound (the dog, the cat, and the like), the cooking sound at the kitchen, and the like. The major noise types and the number of the major noise type may not be limited thereto.

In an operation 1040, the degree of the noise-between-floors for each of the households is monitored based on the noise information and the noise type.

For example, in the operation 1040, a method according to an embodiment of the inventive concept may monitor the predetermined noise-between-floors degree based on the received noise information and noise type. When the noise level exceeds the specific threshold value, the noise feedback about the noise level, the noise direction, and the noise type may be provided to the wall-pad that is provided for each household or to the mobile device possessed by the user for each of the households.

According to an embodiment of the inventive concept, the noise feedback may be provided for each household by analyzing and monitoring the noise level, the noise source location, the noise direction, the occurrence time, the noise type of the noise.

In addition, according to an embodiment of the inventive concept, the air-borne noise and the direct impact noise respectively measured by the microphone array and the sensor module array may be analyzed in a complementary manner for more accurately estimating the noise information and the noise type, and the objective data may be obtained using the same.

In addition, according to an embodiment of the inventive concept, a noise generated in the noise-between-floors generating household and a noise detected in the measuring household may be distinguished and measured such that the causes of the noise may be more accurately analyzed, and a degree of the noise-between-floors for each household may be monitored in a digitized value.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implementations, other embodiments, and equivalents to the claims are within the scope of the following claims.

What is claimed is:

1. A noise-between-floors measuring device comprising:
   a microphone array including a plurality of microphones disposed on a substrate, wherein each microphone of the microphone array measures an air-borne noise detected at each position of each microphone;
   a sensor module array including a plurality of sensor modules disposed on the substrate, wherein each sensor module of the sensor module array measures a direct impact noise to each sensor module detected at each position of each sensor module; and
   a noise analyzing unit configured for analyzing both the air-borne noise and the direct impact noise in a complementary manner, for obtaining noise information about each noise based on the analysis result, and for estimating a noise type of a combination of the air-borne noise and the direct impact noise based on the noise information.

2. The noise-between-floors measuring device of claim 1, wherein the microphones are arranged in a two-dimensional matrix or a multidirectional three-dimensional matrix on a front face of the substrate, and
   wherein the microphone array measures the air-borne noise using air-borne signal data detected at a position of each of the microphones arranged in the matrix and a time of arrival of the air-borne signal data.

3. The noise-between-floors measuring device of claim 1, wherein the sensor modules are arranged in a two-dimensional matrix or a multidirectional three-dimensional matrix on a rear face of the substrate, and
   wherein the sensor module array measures the direct impact noise using impact signal data detected at a position of each of the sensor modules arranged in the matrix and a time of arrival of the impact signal data, wherein the impact signal data results from a pressure or a wall vibration to each sensor module.

4. The noise-between-floors measuring device of claim 1, wherein the noise analyzing unit analyzes at least one of a noise level, a noise source location, a noise direction, and an occurrence time of a noise for each of the air-borne noise and the direct impact noise, and estimates the noise type based on the analyzed result.

5. The noise-between-floors measuring device of claim 4, wherein the noise analyzing unit analyze both of the air-borne noise and the direct impact noise in a complementary manner by collecting average values of the air-borne noise and the direct impact noise respectively measured from the microphone array and the sensor module array, or by assigning weights based on a measurement situation, environment, or timing to the air-borne noise and the direct impact noise.

6. The noise-between-floors measuring device of claim 4, wherein the noise analyzing unit analyzes the noise source location and the noise direction using a Time Difference of Arrival (TDoA) algorithm, wherein the TDoA algorithm is configured to calculate an arrival time difference of a signal based on the time of arrival of the air-borne signal data and the time of arrival of the impact signal data, wherein the air-borne signal data and impact signal data are respectively detected by the microphone array and the sensor module array.

7. The noise-between-floors measuring device of claim 4, wherein the noise analyzing unit analyzes a corresponding noise level using air-borne signal data and a time of arrival of the air-borne signal data and impact signal data and a time of arrival of the impact signal data, wherein the air-borne signal data and impact signal data are respectively detected by the microphone array and the sensor module array.

8. The noise-between-floors measuring device of claim 7, wherein the noise analyzing unit estimates the noise type from a reference table using the air-borne signal data and the impact signal data, wherein the reference table has a pattern corresponding to a noise type, wherein the pattern is generated by a machine learning using a data mining technique based on air-borne signal data and impact signal data.

9. The noise-between-floors measuring device of claim 1, further comprising a controller configured for:
when each measured noise level exceeds a predetermined threshold value, controlling the measurement of the air-borne noise and the direct impact noise respectively by the microphone array and the sensor module array via an event detector or a noise-based algorithm.

10. The noise-between-floors measuring device of claim 9, wherein when the noise information and the noise type are not determined based on the air-borne noise and the direct impact noise, the controller transmits the measurements of the air-borne noise and the direct impact noise to an external server via a communication module, and receives new noise information and a new noise type from the server.

11. The noise-between-floors measuring device of claim 9, wherein when the noise information and the noise type based on the analysis result from the noise analyzing unit deviate from a specific threshold range as a predetermined noise-between-floors range, the controller is configured to transmit at least one output information of a warning alarm and an alarm message to an outside.

12. A noise-between-floors measuring system comprising:
a noise-between-floors measuring device configured:
for measuring an air-borne noise and a direct impact noise respectively using a microphone array and a sensor module array disposed on a substrate;
for analyzing both the air-borne noise and the direct impact noise in a complementary manner; and
for obtaining noise information about each noise based on the analysis result, and for estimating a noise type of a combination of the air-borne noise and the direct impact noise based on the noise information; and
a server configured:
for receiving the noise information and the noise type from the noise-between-floors measuring device; and
for monitoring a level of a noise-between-floors for each floor based on the noise information and the noise type.

13. The noise-between-floors measuring system of claim 12, wherein when the noise-between-floors measuring device does not determine the noise information and the noise type based on the air-borne noise and the direct impact noise,
the device transmits the measurements of the air-borne noise and the direct impact noise to the server, and, then, the server analyzes the measurements to obtain new noise information and a new noise type using a machine learning.

\* \* \* \* \*